(12) United States Patent
Veit

(10) Patent No.: US 8,448,659 B2
(45) Date of Patent: May 28, 2013

(54) CHECK VALVE ASSEMBLY FOR WELL STIMULATION OPERATIONS

(75) Inventor: Jan Veit, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 325 days.

(21) Appl. No.: 13/041,611

(22) Filed: Mar. 7, 2011

(65) Prior Publication Data

US 2012/0227839 A1    Sep. 13, 2012

(51) Int. Cl.
| | |
|---|---|
| *G05D 11/00* | (2006.01) |
| *E21B 43/00* | (2006.01) |
| *E21B 33/00* | (2006.01) |
| *E21B 34/00* | (2006.01) |

(52) U.S. Cl.
USPC ........... 137/111; 166/316; 166/319; 166/321; 166/325

(58) Field of Classification Search
USPC ................. 137/111, 112, 540, 550, 613, 614, 137/2; 166/316, 319, 321, 325
See application file for complete search history.

(56) References Cited

U.S. PATENT DOCUMENTS

| | | | | |
|---|---|---|---|---|
| 1,728,676 A | * | 9/1929 | George | 137/111 |
| 1,982,514 A | * | 11/1934 | Hansen | 137/68.25 |
| 2,358,228 A | * | 9/1944 | Hoof | 137/113 |
| 3,358,770 A | * | 12/1967 | Zandmer | 166/317 |
| 4,022,422 A | * | 5/1977 | Stone | 251/118 |
| 4,030,550 A | | 6/1977 | Mott | |
| 4,360,064 A | * | 11/1982 | O'Connor et al. | 166/319 |
| 5,127,474 A | * | 7/1992 | Schroeder et al. | 166/278 |
| 5,988,282 A | | 11/1999 | Jennings et al. | |
| 6,119,773 A | | 9/2000 | Gariepy et al. | |
| 6,170,581 B1 | | 1/2001 | Lay | |

FOREIGN PATENT DOCUMENTS

WO    2011095512    8/2011

OTHER PUBLICATIONS

International Search Report and Written Opinion, PCT/US2012/025650, KIPO, Jan. 2, 2013.

* cited by examiner

*Primary Examiner* — John Rivell
*Assistant Examiner* — Frederick D Soski
(74) *Attorney, Agent, or Firm* — Lawrence R. Youst

(57) ABSTRACT

A check valve assembly for well stimulation operations. The check valve assembly includes a valve body having an axially extending passageway including an inlet and a valve body seat. The valve body has a discharge port extending laterally from the passageway. A valve cap slidably engages with the valve body and has an opening with a valve cap seat. A piston is disposed within the passageway. In a closed position, a first sealing surface of the piston engages the valve body seat to prevent fluid communication between the inlet and the discharge port. In an open position, a second sealing surface of the piston engages the valve cap seat allowing fluid communication between the inlet and the discharge port. A spring disposed within the passageway between the piston and the valve cap biases the piston toward the closed position.

26 Claims, 8 Drawing Sheets

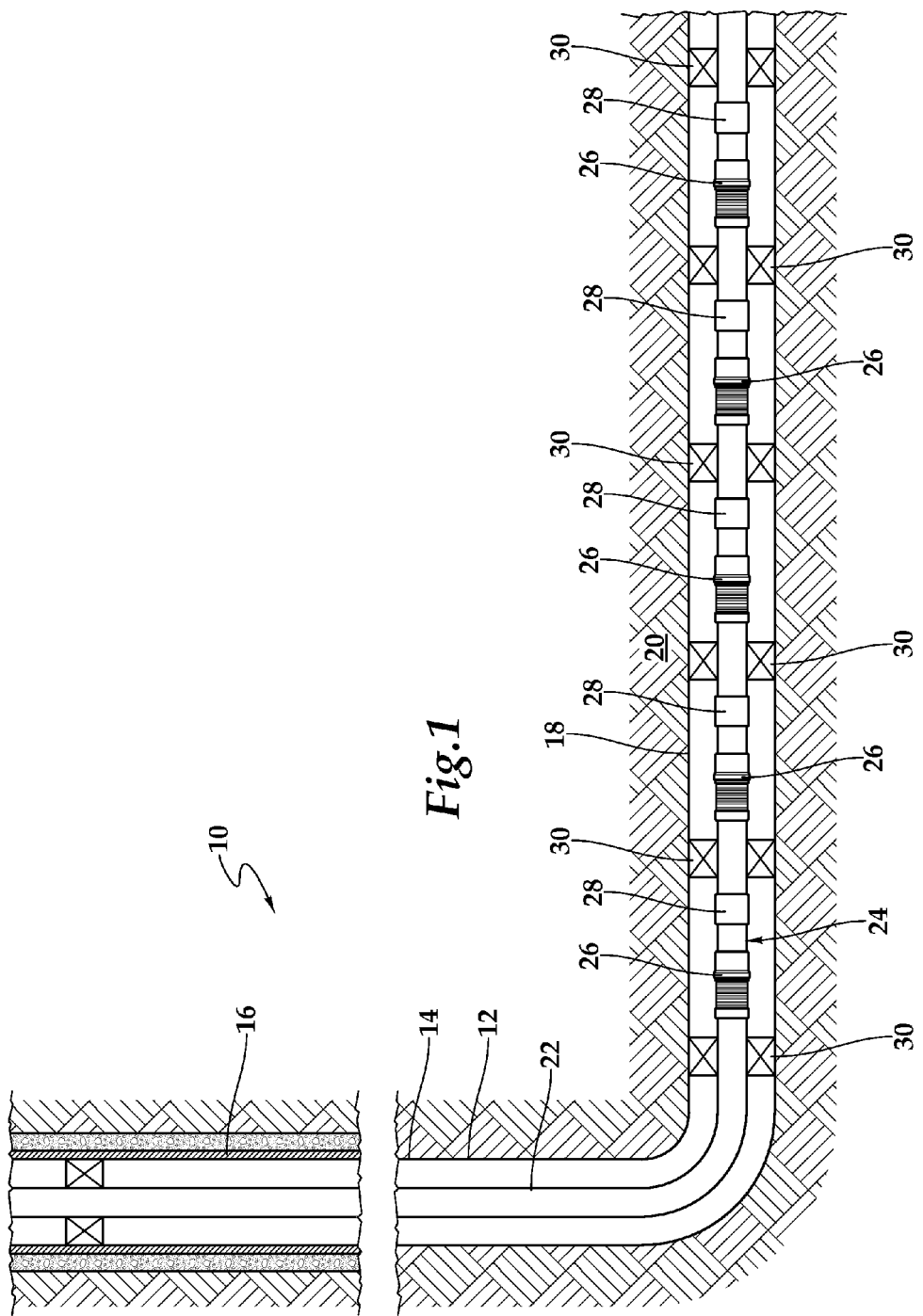

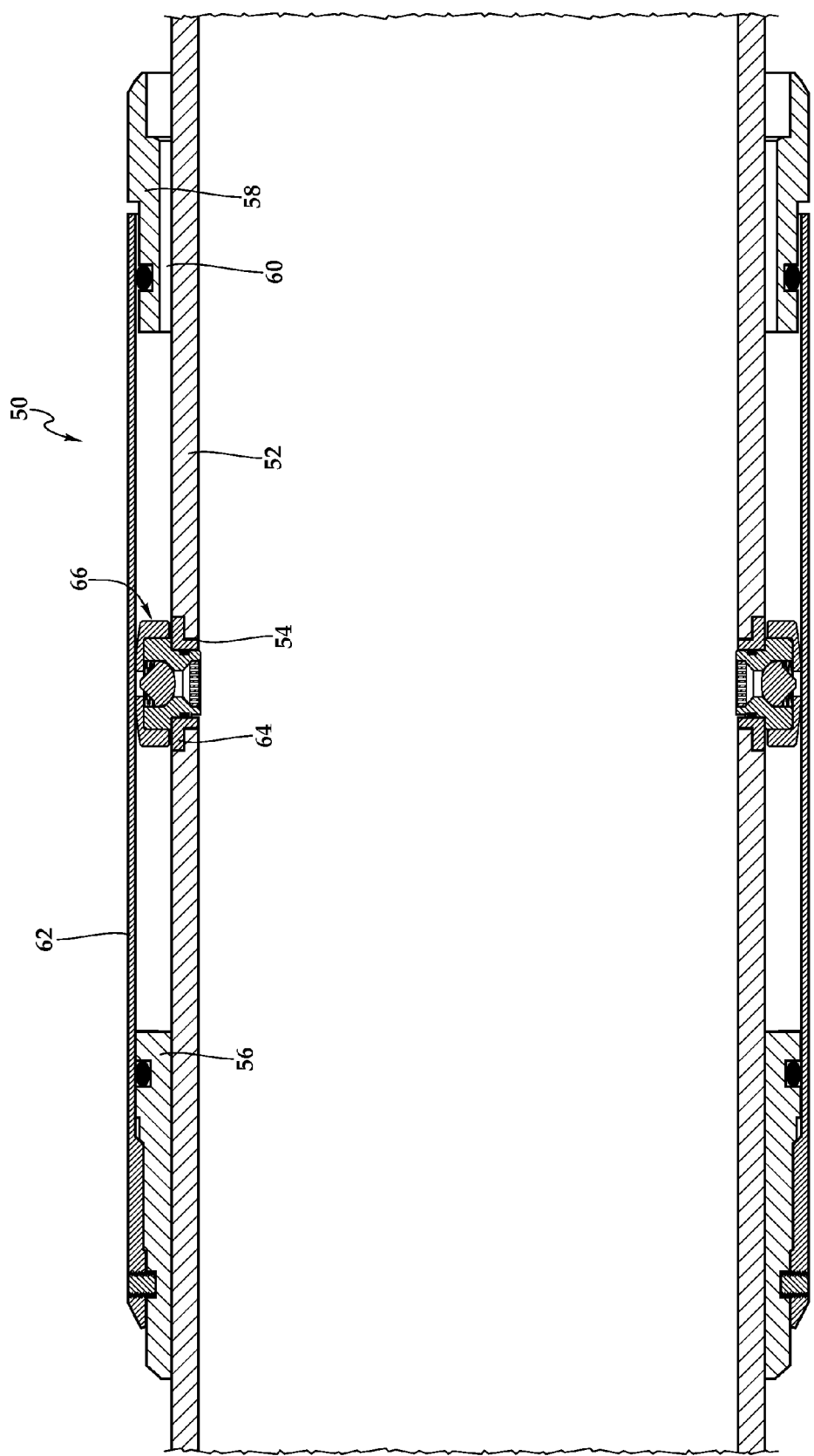

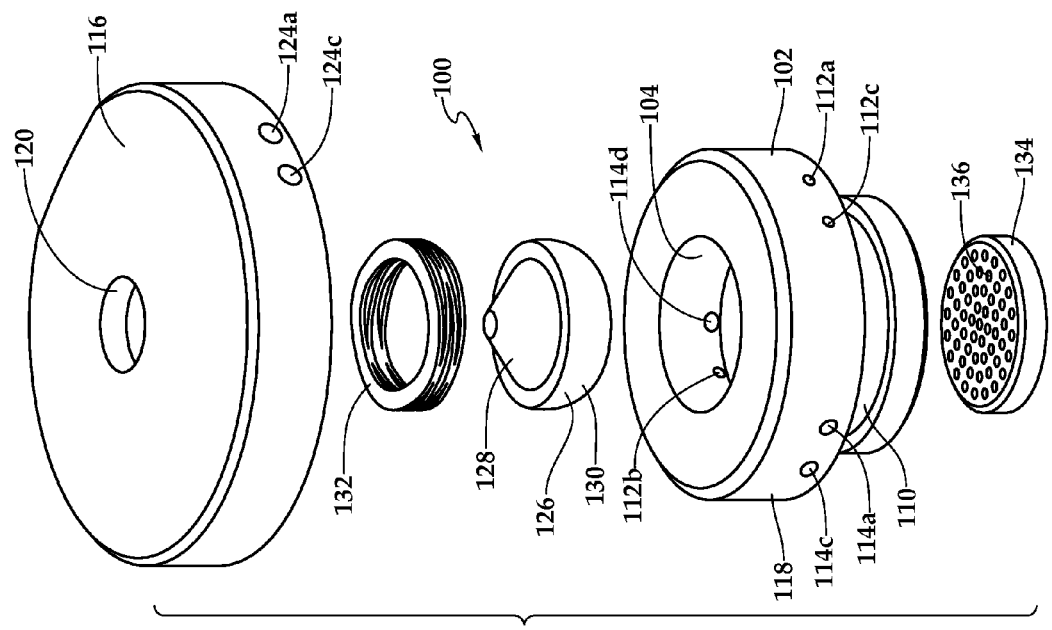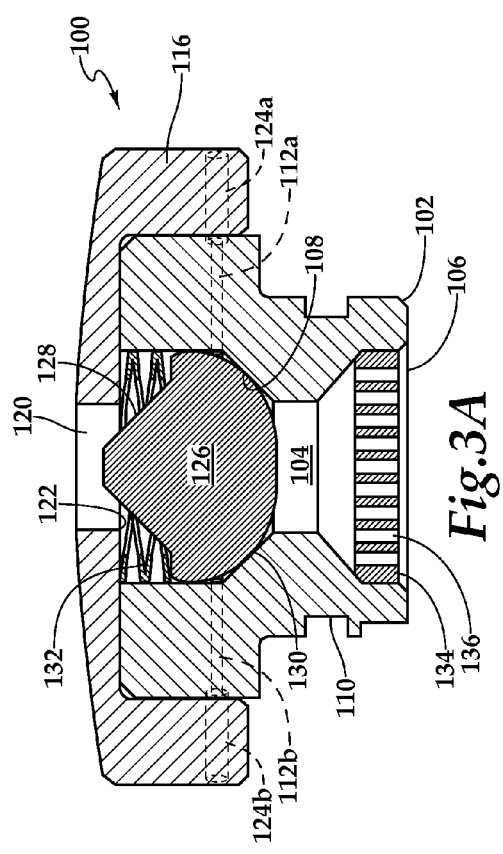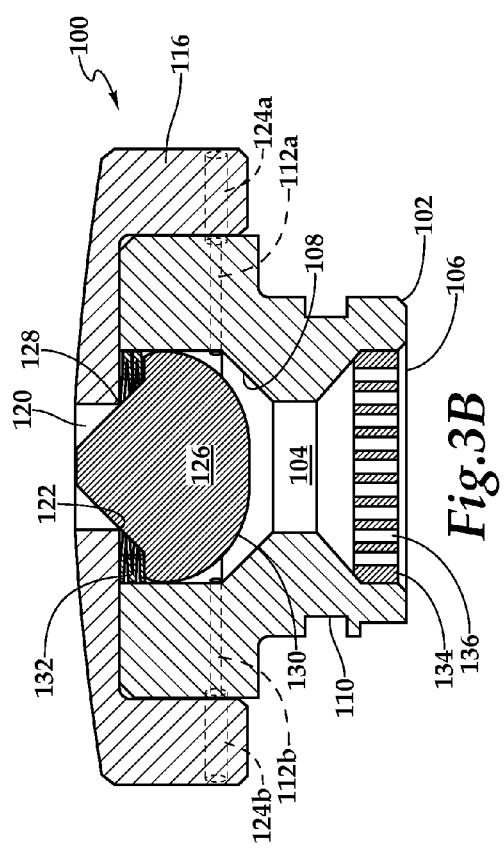

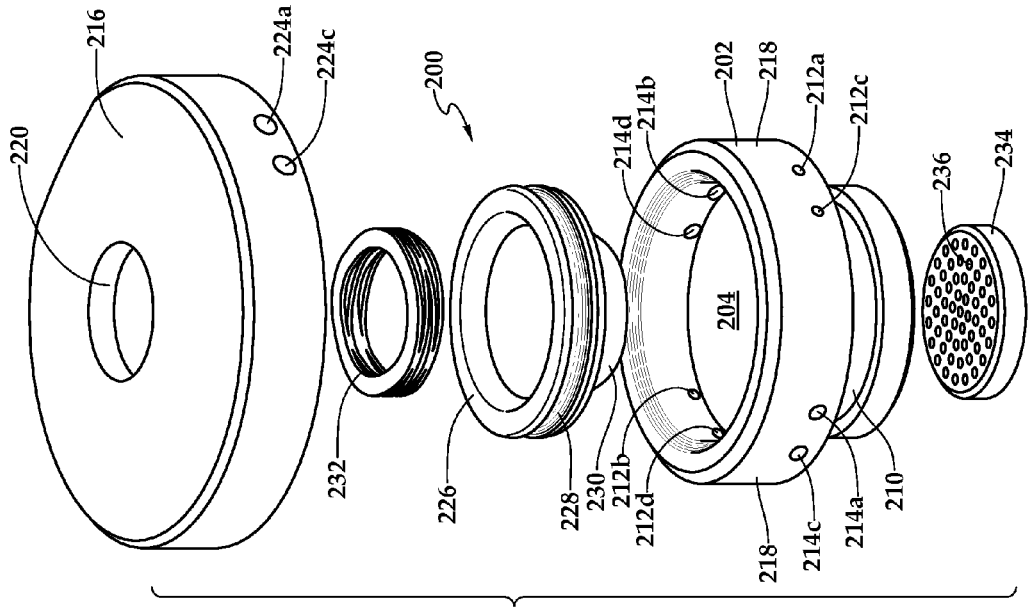
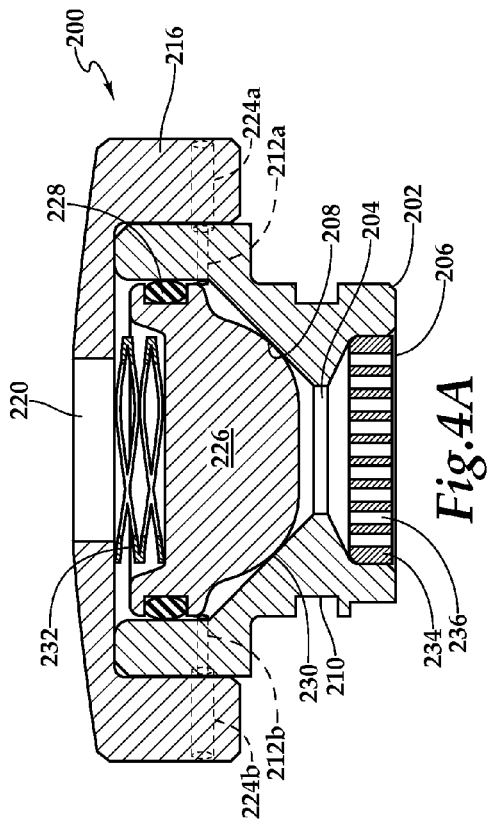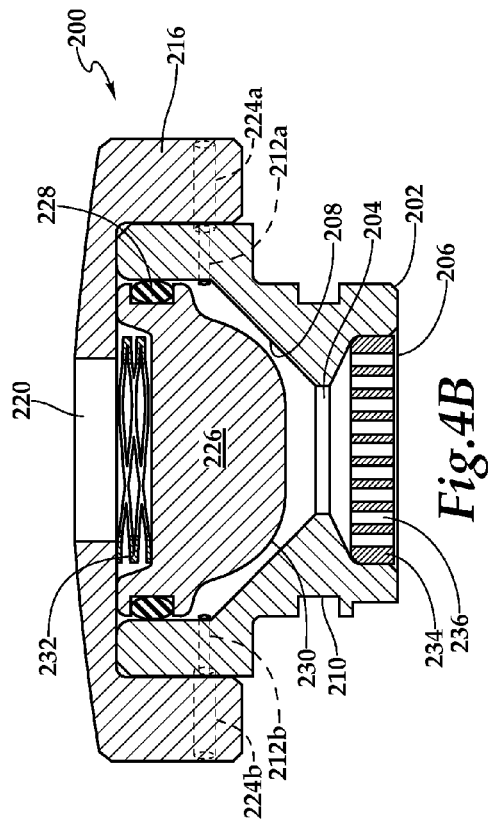

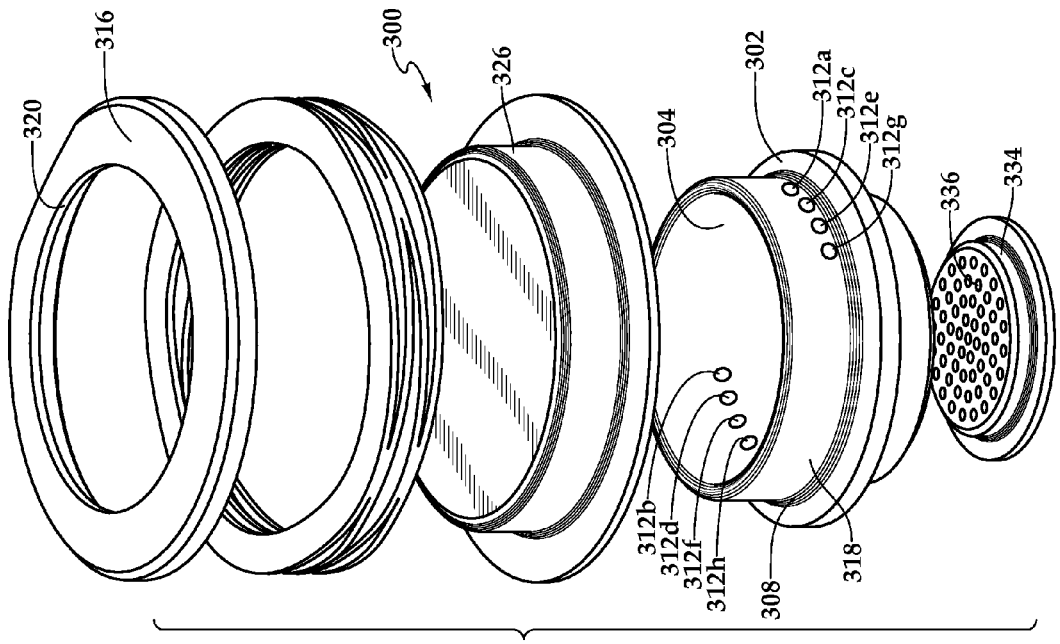
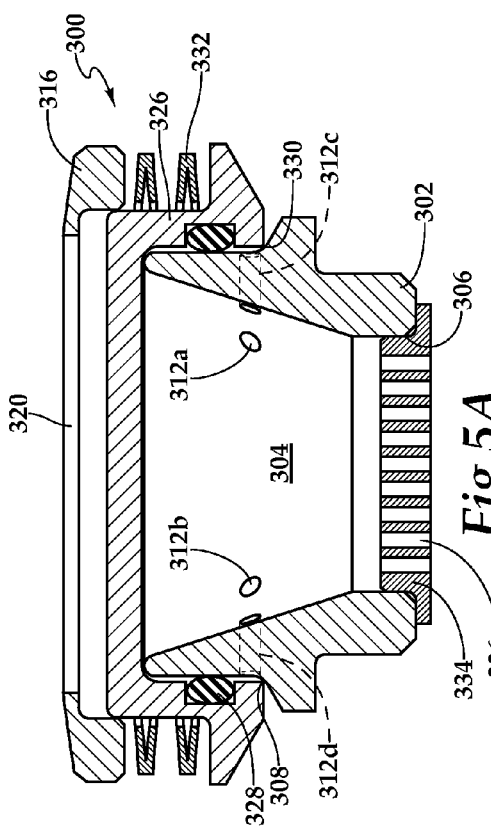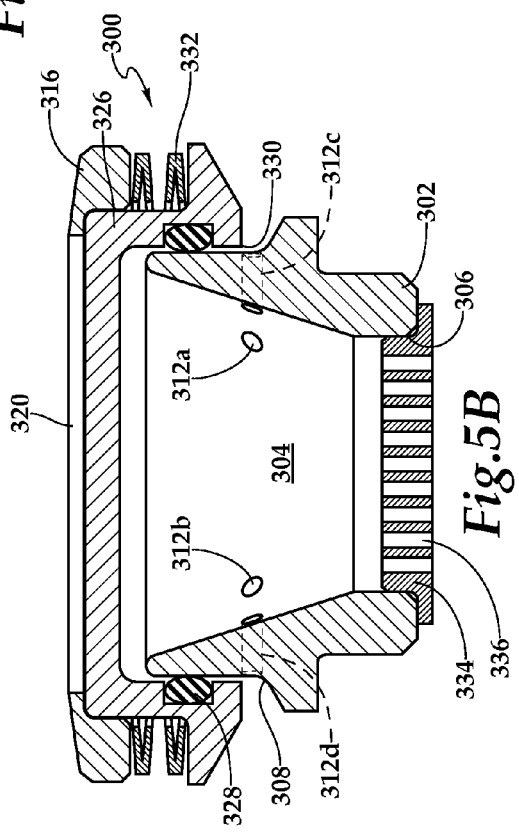

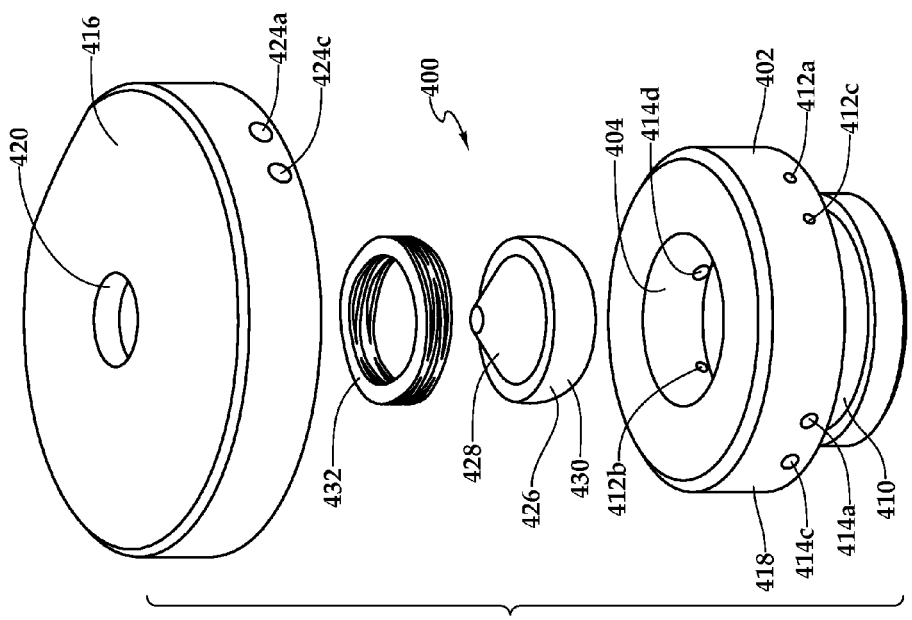
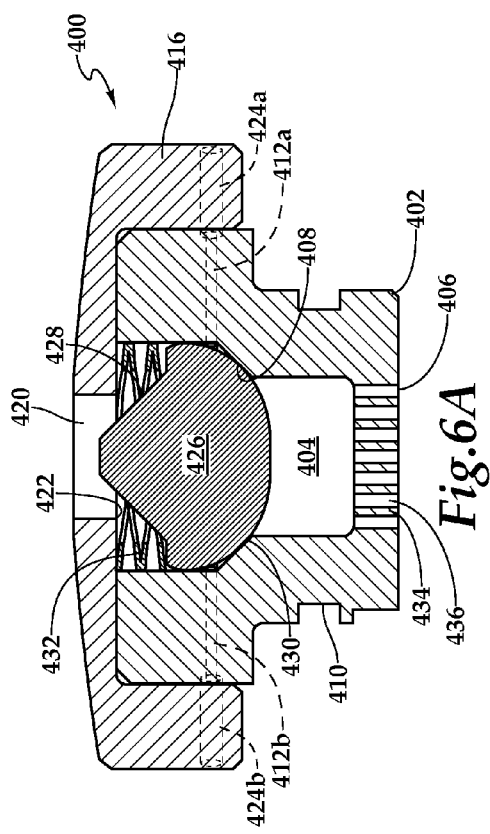
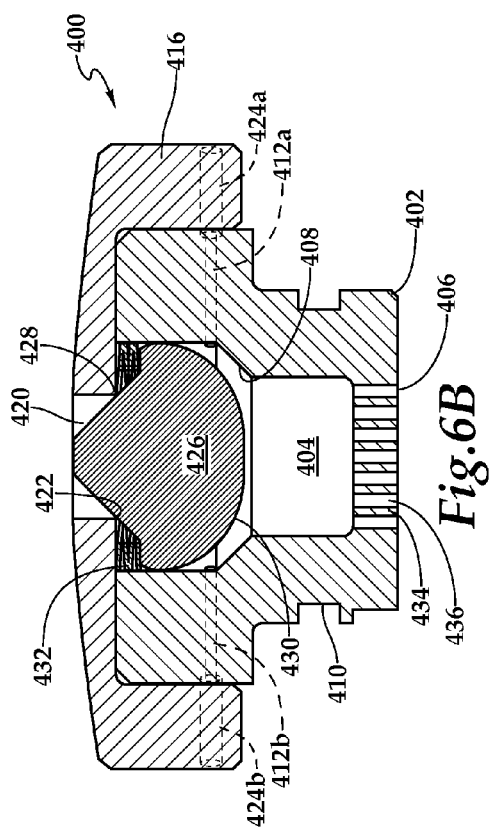

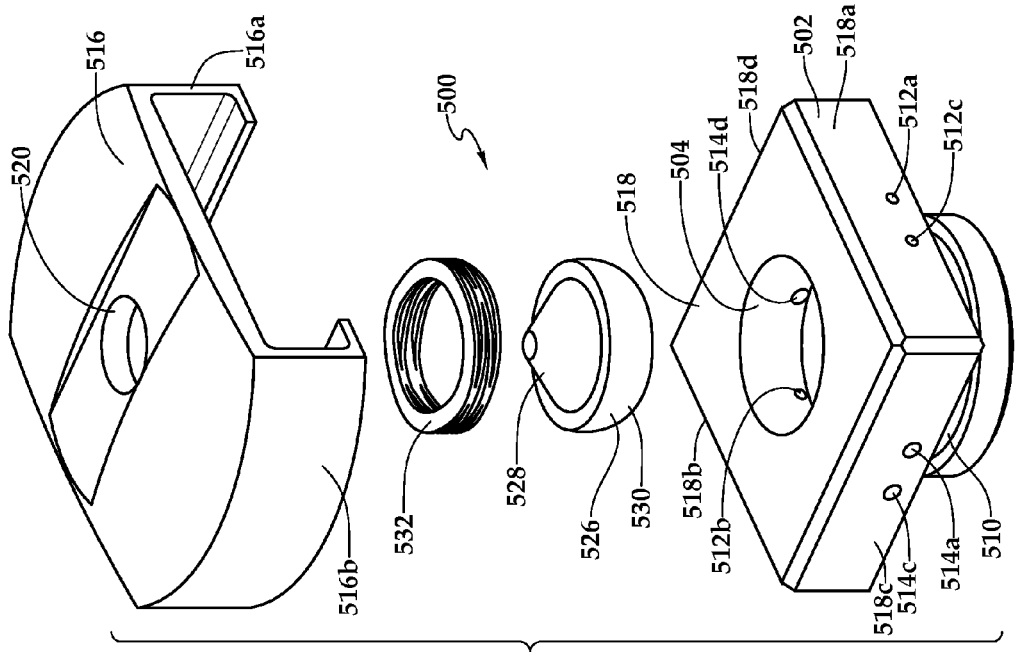
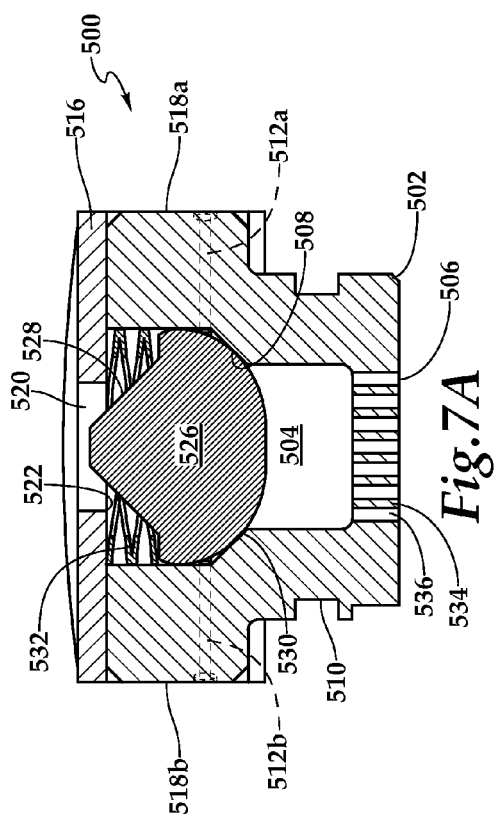
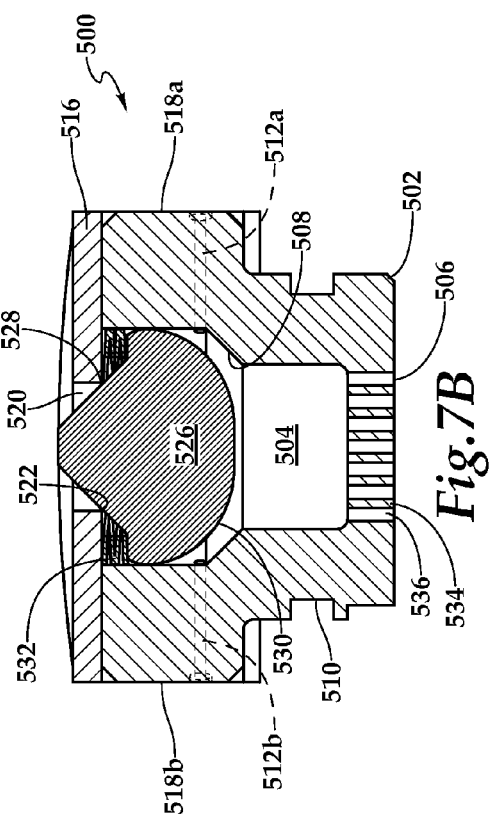

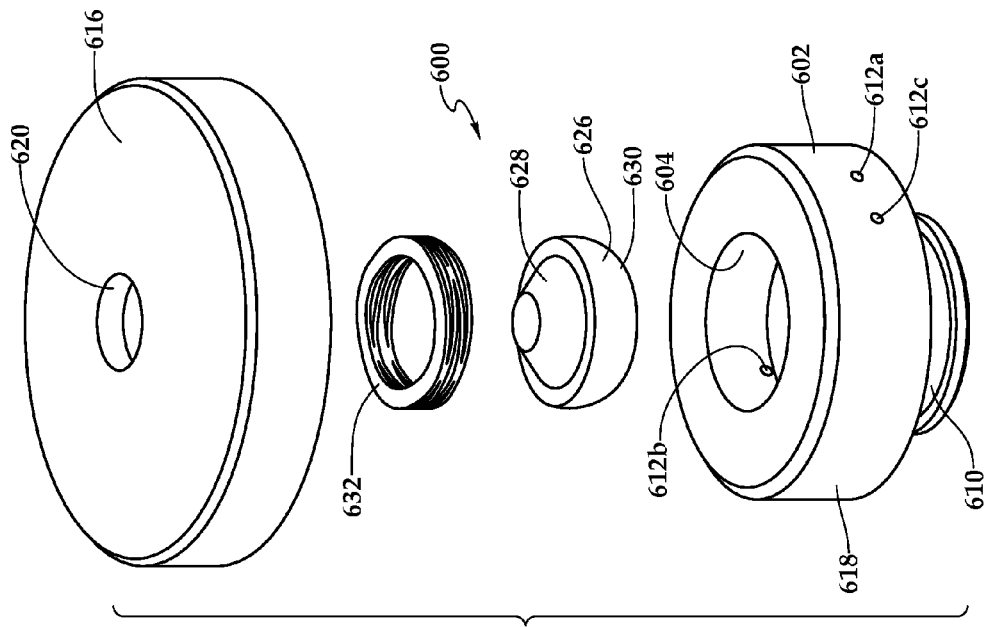
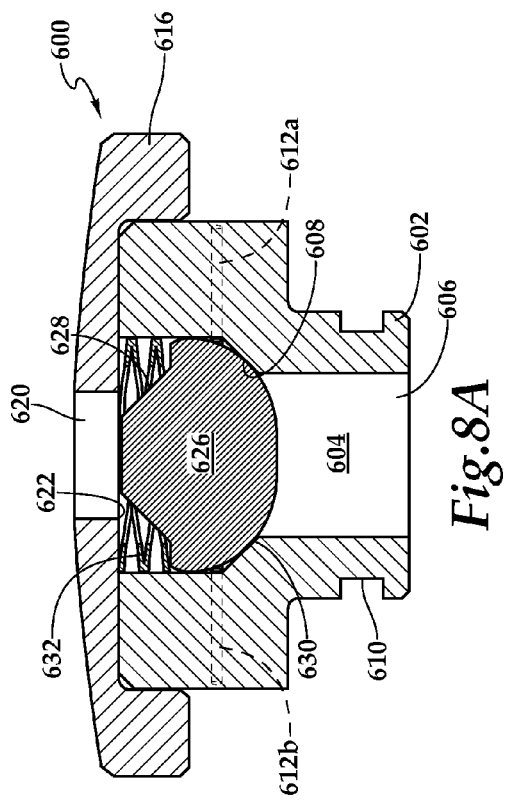
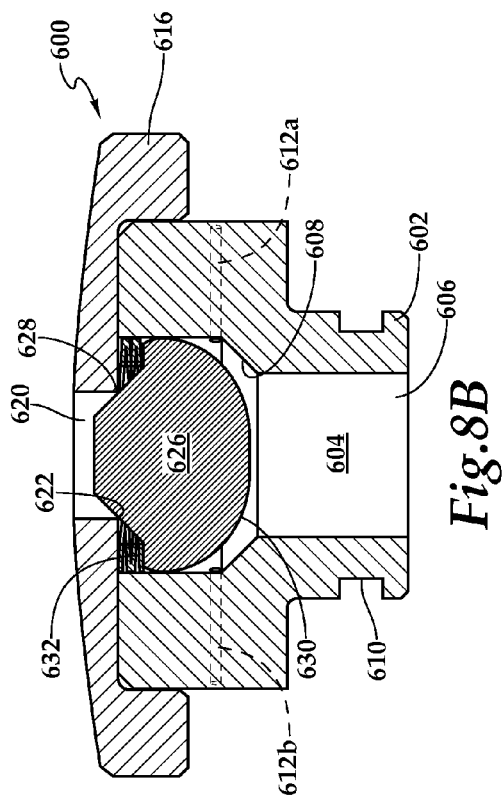

CHECK VALVE ASSEMBLY FOR WELL STIMULATION OPERATIONS

TECHNICAL FIELD OF THE INVENTION

This invention relates, in general, to equipment utilized in conjunction with operations performed in relation to subterranean wells and, in particular, to a check valve assembly operable to prevent the inflow of production fluids but allow the injection of treatment fluids for well stimulation operations.

BACKGROUND OF THE INVENTION

Without limiting the scope of the present invention, its background will be described in relation to stimulation operations in a wellbore that traverses a subterranean hydrocarbon bearing formation, as an example.

During drilling and construction of wellbores that transverse hydrocarbon bearing formations, it is oftentimes desirable to form a filter cake on the face of the formation to minimize damage to the permeability thereof. The filter cake often comprises an acid-soluble component such as a calcium carbonate bridging agent and a polymeric component such as starch and xanthan. Before desirable fluids, such as hydrocarbons, may be produced from the formation, the filter cake must be removed. One method of removing the filter cake is to inject a treatment fluid, such as a hydrochloric acid solution, into the wellbore.

In addition to filter cake removal, hydrochloric acid solutions are also used in treatments carried out to stimulate the subterranean hydrocarbon bearing formation traversed by the wellbore. For example, the hydrochloric acid solution is injected into the subterranean formation to react with acid soluble materials in the formation and enlarge pore spaces in the formation. These acidizing treatments are designed to improve the formation permeability, which enhances production of reservoir fluids. Typically, such acidizing operations are performed at a high flowrate, but at a treatment pressure below the fracture pressure of the formation such that the acid penetrates an extended distance into the formation while avoiding causing damage to the formation. Attempts have been made to inject treatment fluids as reverse flow through conventional inflow control devices that utilize one or more flow restrictors such as flow tubes, nozzles, labyrinths or the like. It has been found, however, that the flowrate required for acidizing operations is typically higher than the production flowrate from the formation. As such, reverse flow through conventional inflow control devices results in an unacceptably high pressure drop in the treatment fluid.

Accordingly, a need has arisen for an apparatus that is operable to inject a treatment fluid into the wellbore and the surrounding formation. A need has also arisen for such an apparatus that is operable to inject the treatment fluid at a high flowrate. Further, need has arisen for such an apparatus that is operable to inject the treatment fluid without an unacceptably high pressure drop.

SUMMARY OF THE INVENTION

The present invention disclosed herein is directed to a check valve assembly for well stimulation operations. The check valve assembly is operable to inject a treatment fluid into the wellbore and the surrounding formation. In addition, the check valve assembly of the present invention is operable to inject the treatment fluid at a high flowrate. Further, the check valve assembly of the present invention is operable to inject the treatment fluid without an unacceptably high pressure drop.

In one aspect, the present invention is directed to a check valve assembly for well stimulation operations. The check valve assembly includes a valve body having an axially extending passageway including an inlet and a valve body seat. The valve body has a first discharge port extending laterally from the passageway. A valve cap is slidably engagable with the valve body. The valve cap has an opening with a valve cap seat. A piston disposed within the passageway has first and second sealing surfaces. In a closed position, the first sealing surface engages the valve body seat to prevent fluid communication between the inlet and the first discharge port. In an open position, the second sealing surface engages the valve cap seat allowing fluid communication between the inlet and the first discharge port. A spring disposed within the passageway between the piston and the valve cap biases the piston toward the closed position.

In one embodiment, the valve body has a cylindrical section and the valve cap slidably engages the cylindrical section of the valve body in the axial direction. In another embodiment, the valve body has a square prism section and the valve cap slidably engages the square prism section of the valve body in a direction orthogonal to the axial direction. In a further embodiment, the first and second sealing surfaces of the piston are oppositely disposed from one another. In some embodiments, the valve cap has at least one discharge port that is alignable with the first discharge port of the valve body. In certain embodiments, a filter member is positioned within the passageway proximate to the inlet. In other embodiments, the filter member integral with the valve body.

In one embodiment, the valve body has a second discharge port extending in a second lateral direction from the passageway. The second discharge port has a flow area that is less restrictive than a flow area of the first discharge port. In this embodiment, the valve cap may have at least one discharge port that is selectively alignable with the first discharge port and the second discharge port such that a pressure drop in fluids traveling through the check valve is adjustable. In another embodiment, the valve body has a pair of oppositely disposed first discharge ports and a pair of oppositely disposed second discharge ports. In this embodiment, the valve cap may have at least two discharge ports that are selectively alignable with the pair of first discharge ports and the pair of second discharge ports such that a pressure drop in fluids traveling through the check valve is adjustable.

In a further embodiment, the valve body has two pair of oppositely disposed first discharge ports and two pair of oppositely disposed second discharge ports. In this embodiment, the valve cap may have four discharge ports that are selectively alignable with the two pair of first discharge ports and the two pair of second discharge ports such that a pressure drop in fluids traveling through the check valve is adjustable.

In another aspect, the present invention is directed to a check valve assembly for well stimulation operations. The check valve assembly includes a valve body having an axially extending passageway including an inlet and a valve body seat. The valve body has a square prism section with a pair of oppositely disposed first sides and a pair of oppositely disposed second sides. The valve body has a first discharge port extending laterally from the passageway to one of the first sides and a second discharge port extending laterally from the passageway to one of the second sides. The second discharge port has a flow area that is less restrictive than a flow area of the first discharge port. A valve cap has a pair of oppositely disposed rails that are slidably engagable with the square prism section of the valve body. In one configuration, the rails slide relative to the first sides of the square prism section enabling flow through the second discharge port. In another configuration, the rails slide relative to the second sides of the square prism section enabling flow through the first discharge port. The valve cap has an opening with a valve cap seat. A piston disposed within the passageway has first and second sealing surfaces. In a closed position, the first sealing surface engages the valve body seat to prevent fluid communication between the inlet and the discharge ports. In an open position, the second sealing surface engages the valve cap seat allowing fluid communication between the inlet and the discharge ports. A spring disposed within the passageway between the piston and the valve cap biases the piston toward the closed position.

In a further aspect, the present invention is directed to a check valve assembly for well stimulation operations. The check valve assembly includes a valve body having an axially extending passageway including an inlet and a valve body seat. The valve body has at least one discharge port extending laterally from the passageway. A valve cap is slidably engagable with the valve body. The valve cap has an opening with a valve cap seat. A piston disposed within the passageway has first and second sealing surfaces. In a closed position, the first sealing surface engages the valve body seat to prevent fluid communication between the inlet and the at least one discharge port. In an open position, the second sealing surface engages the valve cap seat allowing fluid communication between the inlet and the at least one discharge port. A spring disposed within the passageway between the piston and the valve cap biases the piston toward the closed position.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a schematic illustration of a well system including a plurality of injection assemblies according to an embodiment of the present invention;

FIG. 2 is a cross sectional view of an injection assembly including a plurality of check valve assemblies for well stimulation operations according to an embodiment of the present invention;

FIGS. 3A-B are cross sectional views of a check valve assembly for well stimulation operations according to an embodiment of the present invention in valve closed and valve open configurations, respectively;

FIG. 3C is an exploded view of a check valve assembly for well stimulation operations according to an embodiment of the present invention;

FIGS. 4A-B are cross sectional views of a check valve assembly for well stimulation operations according to an embodiment of the present invention in valve closed and valve open configurations, respectively;

FIG. 4C is an exploded view of a check valve assembly for well stimulation operations according to an embodiment of the present invention;

FIGS. 5A-B are cross sectional views of a check valve assembly for well stimulation operations according to an embodiment of the present invention in valve closed and valve open configurations, respectively;

FIG. 5C is an exploded view of a check valve assembly for well stimulation operations according to an embodiment of the present invention;

FIGS. 6A-B are cross sectional views of a check valve assembly for well stimulation operations according to an embodiment of the present invention in valve closed and valve open configurations, respectively;

FIG. 6C is an exploded view of a check valve assembly for well stimulation operations according to an embodiment of the present invention;

FIGS. 7A-B are cross sectional views of a check valve assembly for well stimulation operations according to an embodiment of the present invention in valve closed and valve open configurations, respectively;

FIG. 7C is an exploded view of a check valve assembly for well stimulation operations according to an embodiment of the present invention;

FIGS. 8A-B are cross sectional views of a check valve assembly for well stimulation operations according to an embodiment of the present invention in valve closed and valve open configurations, respectively; and FIG. 8C is an exploded view of a check valve assembly for well stimulation operations according to an embodiment of the present invention.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Referring initially to FIG. 1, therein is depicted a well system including a plurality of injection assemblies embodying principles of the present invention that is schematically illustrated and generally designated 10. In the illustrated embodiment, a wellbore 12 extends through the various earth strata. Wellbore 12 has a substantially vertical section 14, the upper portion of which has cemented therein a casing string 16. Wellbore 12 also has a substantially horizontal section 18 that extends through a hydrocarbon bearing subterranean formation 20. As illustrated, substantially horizontal section 18 of wellbore 12 is open hole.

Positioned within wellbore 12 and extending from the surface is a tubing string 22. Tubing string 22 provides a conduit for formation fluids to travel from formation 20 to the surface. At its lower end, tubing string 22 is coupled to a completion string 24 that has been installed in wellbore 12 and divides the completion interval into various production intervals adjacent to formation 20. Completion string 24 includes a plurality of sand control screen assemblies 26 and a plurality of injection assemblies 28. In addition, completion string 24 includes a plurality of packers 30 that provides fluid seals between completion string 24 and wellbore 12, thereby defining the production intervals.

Sand control screen assemblies 26 serve the primary function of filtering particulate matter out of the production fluid stream. In addition, sand control screen assemblies 26 may preferably include inflow control devices that control the flowrate of the production fluid stream into completion string 24. For example, the inflow control devices may utilize one or more flow restrictors such as flow tubes, nozzles, labyrinths or the like to control the production flowrate. In certain completions, it is desirable to stimulate the formation to improve permeability, which enhances production of reservoir fluids. In one type of stimulation operation, acid, such as a hydrochloric acid solution, is injected into the formation at a flowrate that may be significantly higher than the design production flowrate. As such, reverse flow through the inflow control devices in sand control screen assemblies 26 may result in an unacceptably high pressure drop in the treatment fluid. According to the present invention, however, injection assemblies 28 are positioned within each production interval such that a stimulation operation can uniformly treat formation 20 by injecting the desired treatment fluid at the desired high flowrate without experiencing an unacceptably high pressure drop.

Even though FIG. 1 depicts the injection assemblies of the present invention in an open hole environment, it should be understood by those skilled in the art that the injection assemblies of the present invention are equally well suited for use in cased wells. Also, even though FIG. 1 depicts one sand control screen assembly and one injection assembly in each production interval, it should be understood by those skilled in the art that any number of sand control screen assemblies and any number of injection assemblies of the present invention in any ratio relative to each other may be deployed within a production interval without departing from the principles of the present invention. In addition, even though figure depicts multiple production intervals separated by packers, it should be understood by those skilled in the art that the completion interval may have any number of production intervals including a single interval with a corresponding number of packers or no packers.

Even though FIG. 1 depicts the injection assemblies of the present invention in a horizontal section of the wellbore, it should be understood by those skilled in the art that the injection assemblies of the present invention are equally well suited for use in wells having other directional configurations including vertical wells, deviated wells, slanted wells, multilateral wells and the like. Accordingly, it should be understood by those skilled in the art that the use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Referring next to FIG. 2, therein is depicted an injection assembly for well stimulation operations according to an embodiment of the present invention that is generally designated 50. In the illustrated embodiment, injection assembly 50 includes a tubular member 52 having a plurality of openings 54. An upper connection assembly 56 and a lower connection assembly 58 are positioned around tubular member 52 and are securably attached thereto by welding or other suitable technique. Lower connection assembly 58 includes a plurality of channels 60 that provide a path for fluid injection from injection assembly 50 into the wellbore. Alternatively or additionally, upper connection assembly 56 may provide a path for fluid injection from injection assembly 50 into the wellbore. Securably and sealing coupled to upper connection assembly 56 and lower connection assembly 58 is an outer sleeve 62.

In the illustrated embodiment, an insert ring 64 is positioned in each opening 54 of tubular 52. Insert rings 64 may be securably coupled within openings 54 by welding, threading or similar technique or insert rings 64 may be inserted into openings 54 and held in place with an interference fit therebetween. Insert rings 64 preferably have a precision inner diameter sized to receive and retain a check valve assembly 66 therein. In addition, insert rings 64 preferably include an extension (not pictured) designed to align check valve assemblies 66 and/or component parts thereof such that fluid discharged from check valve assemblies 66 is directed in the axial direction of injection assembly 50 and not in the circumferential direction of injection assembly 50 to prevent erosion of sleeve 62. As illustrated, sleeve 62 preferably has a close fitting relationship with check valve assemblies 66 which assures that check valve assemblies 66 remain fixed in insert rings 64 and the component parts of check valve assemblies 66 remain properly configured and oriented.

Referring now to FIGS. 3A-3C, therein is depicted a check valve assembly for well stimulation operations according to an embodiment of the present invention that is generally designated 100. Check valve assembly 100 includes a valve body 102 having an axially extending passageway 104 that has an inlet 106 and a valve body seat 108. Valve body 102 also includes an o-ring groove 110 operable to receive an o-ring therein which provides a seal and support between valve body 102 and the insert ring that receives check valve assembly 100. Valve body 102 has a plurality of discharge ports that extend laterally from passageway 104. In the illustrated embodiment, valve body 102 has two sets of four discharge ports. Specifically, valve body 102 has discharge ports 112a-d (only 112a-c being visible) and discharge ports 114a-d (only 114a and 114c-d being visible). As illustrated, discharge ports 112a and 112b are oppositely disposed and may be referred to as a pair of oppositely disposed discharge ports. In addition, discharge ports 112c and 112d are oppositely disposed. Together, discharge ports 112a-d may be referred to as two pair of oppositely disposed discharge ports. Likewise, discharge ports 114a and 114b are oppositely disposed and discharge ports 114c and 114d are oppositely disposed. Importantly, discharge ports 114a-d have a flow area that is less restrictive than the flow area of discharge ports 112a-d which enables the flowrate and pressure drop of treatment fluid through check valve assembly 100 to be adjustable as discussed below.

Check valve assembly 100 includes a valve cap 116 that is slidably received about a cylindrical section 118 of valve body 102. Valve cap 116 has an opening 120 and a valve cap seat 122. In the illustrated embodiment, valve cap 116 has four discharge ports 124a-d (only 124a-c being visible). This design enables selective alignment of discharge ports 124 with either discharge ports 112 or discharge ports 114. When discharge ports 124 are aligned with discharge ports 112, flow through discharge ports 114 is prevented. Likewise, when discharge ports 124 are aligned with discharge ports 114, flow through discharge ports 112 is prevented. In this manner, selective positioning of valve cap 116 on valve body 102 determines whether discharge ports 112 or discharge ports 114 are available for flow which in turn determines the resistance to flow encounter by the treatment fluid traveling through check valve assembly 100.

A piston 126 is disposed within passageway 104. Piston 126 has an upper sealing surface 128 and a lower sealing surface 130 which are oppositely disposed from one another. A spring 132 is disposed within passageway 104 between piston 126 and valve cap 116. Spring 132 biases piston 126 downwardly or toward the closed position of check valve assembly 100. A filter member 134 is positioned within passageway 104 proximate to inlet 106. Filter member 134 has a plurality of openings 136 therethrough which preferably have a diameter smaller than the diameter of discharge ports 112 to prevent any debris of a predetermined size from entering check valve assembly 100.

The operation of check valve assembly 100 will now be described. As illustrated, discharge ports 124 have been aligned with discharge ports 112 such that check valve assembly 100 is in its more restrictive configuration. Prior to the stimulation operation, as best seen in FIG. 3A, lower sealing surface 130 of piston 126 is engaged with valve body seat 108. In this configuration, spring 132 biases piston 126 downwardly and any pressure from the wellbore communicates through opening 120 of valve cap 116, which also biases piston 126 downwardly. The seal created between piston 126 and valve body 102 prevents fluid communication between inlet 106 and discharge ports 112, 114.

Once the stimulation operation commences, piston 126 is lifted off valve body seat 108 when the pressure inside of the injection assembly reached a predetermined level sufficient to overcome the spring force and any opposing wellbore pressure. Once piston 126 is lifted off valve body seat 108, the internal pressure of the injection assembly is now applied to a larger area on piston 126 which means the pressure to maintain check valve assembly 100 in the open position is less than the pressure required to open check valve assembly 100. As best seen in FIG. 3B, piston 126 travels upwardly in passageway 104 until upper sealing surface 128 engages with valve cap seat 122 forming a seal therewith. In this configuration, the treatment fluid enters check valve assembly 100 at inlet 106, passes through filter 134 and exits check valve assembly 100 through discharge ports 112 of valve body 102 and discharge ports 124 of valve cap 116.

When the stimulation operation is complete, the internal pressure within the injection assembly is reduced until it is no longer sufficient to overcome the spring force and any opposing wellbore pressure. Lower sealing surface 130 of piston 126 then reengages with valve body seat 108, as best seen in FIG. 3A. In this configuration, production fluids are disallowed from entering the completion string through check valve assembly 100.

Referring now to FIGS. 4A-4C, therein is depicted a check valve assembly for well stimulation operations according to an embodiment of the present invention that is generally designated 200. Check valve assembly 200 includes a valve body 202 having an axially extending passageway 204 that has an inlet 206 and a valve body seat 208. Valve body 202 also includes an o-ring groove 210. Valve body 202 has a plurality of discharge ports that extend laterally from passageway 204. Specifically, valve body 202 has discharge ports 212a-d and discharge ports 214a-d wherein discharge ports 214a-d have a flow area that is less restrictive than the flow area of discharge ports 212a-d which enables the flowrate and pressure drop of treatment fluid through check valve assembly 200 to be adjustable.

Check valve assembly 200 includes a valve cap 216 that is slidably received about a cylindrical section 218 of valve body 202. Valve cap 216 has an opening 220. In the illustrated embodiment, valve cap 216 has four discharge ports 224a-d which enables selective alignment of discharge ports 224 with either discharge ports 212 or discharge ports 214. When discharge ports 224 are aligned with discharge ports 212, flow through discharge ports 214 is prevented. Likewise, when discharge ports 224 are aligned with discharge ports 214, flow through discharge ports 212 is prevented. In this manner, selective positioning of valve cap 216 on valve body 202 determines whether discharge ports 212 or discharge ports 214 are available for flow which in turn determines the resistance to flow encounter by the treatment fluid traveling through check valve assembly 200.

A piston 226 is disposed within passageway 204. Piston 226 has an o-ring 228 positioned therearound and a lower sealing surface 230. A spring 232 is disposed within passageway 204 between piston 226 and valve cap 216. Spring 232 biases piston 226 downwardly or toward the closed position of check valve assembly 200. A filter member 234 is positioned within passageway 204 proximate to inlet 206. Filter member 234 has a plurality of openings 236 therethrough.

The operation of check valve assembly 200 will now be described. As illustrated, discharge ports 224 have been aligned with discharge ports 212 such that check valve assembly 200 is in its more restrictive configuration. Prior to the stimulation operation, as best seen in FIG. 4A, lower sealing surface 230 of piston 226 is engaged with valve body seat 208. In this configuration, spring 232 biases piston 226 downwardly and any pressure from the wellbore communicates through opening 220 of valve cap 216, which also biases piston 226 downwardly. The seal created between piston 226 and valve body 202 prevents fluid communication between inlet 206 and discharge ports 212, 214.

Once the stimulation operation commences, piston 226 is lifted off valve body seat 208 when the pressure inside of the injection assembly reached a predetermined level sufficient to overcome the spring force and any opposing wellbore pressure. Once piston 226 is lifted off valve body seat 208, the internal pressure of the injection assembly is now applied to a larger area on piston 226 which means the pressure to maintain check valve assembly 200 in the open position is less than the pressure required to open check valve assembly 200. As best seen in FIG. 4B, piston 226 travels upwardly in passageway 204 until its upper surface contacts valve cap 216. O-ring 228 provides a seal between piston 226 and valve body 202. In this configuration, the treatment fluid enters check valve assembly 200 at inlet 206, passes through filter 234 and exits check valve assembly 200 through discharge ports 212 of valve body 202 and discharge ports 224 of valve cap 216.

When the stimulation operation is complete, the internal pressure within the injection assembly is reduced until it is no longer sufficient to overcome the spring force and any opposing wellbore pressure. Lower sealing surface 230 of piston 226 then reengages with valve body seat 208, as best seen in FIG. 4A. In this configuration, production fluids are disallowed from entering the completion string through check valve assembly 200.

Referring now to FIGS. 5A-5C, therein is depicted a check valve assembly for well stimulation operations according to an embodiment of the present invention that is generally designated 300. Check valve assembly 300 includes a valve body 302 having an axially extending passageway 304 that has an inlet 306 and a valve body seat 308. Valve body 302 has a plurality of discharge ports that extend laterally from passageway 304. Specifically, valve body 302 has discharge ports 312a-h.

Check valve assembly 300 includes a valve cap 316 that has an opening 320. A piston 326 is disposed within passageway 304. Piston 326 has an o-ring 328 positioned therein and a lower sealing surface 330. A spring 332 is disposed between piston 326 and valve cap 316. Spring 332 biases piston 326 downwardly or toward the closed position of check valve assembly 300. A filter member 334 is positioned within passageway 304 proximate to inlet 306. Filter member 334 has a plurality of openings 336 therethrough.

The operation of check valve assembly 300 will now be described. Prior to the stimulation operation, as best seen in FIG. 5A, lower sealing surface 330 of piston 326 is engaged with valve body seat 308. In this configuration, spring 332 biases piston 326 downwardly and any pressure from the wellbore communicates through opening 320 of valve cap 316, which also biases piston 326 downwardly. The seal created between piston 326 and valve body 302 prevents fluid from communicating through discharge ports 312.

Once the stimulation operation commences, piston 326 is lifted off valve body seat 308 when the pressure inside of the injection assembly reached a predetermined level sufficient to overcome the spring force and any opposing wellbore pressure. As best seen in FIG. 5B, piston 326 travels upwardly until its upper surface contacts valve cap 316. O-ring 328 provides a seal between piston 326 and valve body 302. In this configuration, the treatment fluid enters check valve assembly 300 at inlet 306, passes through filter 334 and exits check valve assembly 300 through discharge ports 312 of valve body 302.

When the stimulation operation is complete, the internal pressure within the injection assembly is reduced until it is no longer sufficient to overcome the spring force and any opposing wellbore pressure. Lower sealing surface 330 of piston 326 then reengages with valve body seat 308, as best seen in FIG. 5A. In this configuration, production fluids are disallowed from entering the completion string through check valve assembly 300.

Referring now to FIGS. 6A-6C, therein is depicted a check valve assembly for well stimulation operations according to an embodiment of the present invention that is generally designated 400. Check valve assembly 400 includes a valve body 402 having an axially extending passageway 404 that has an inlet 406 and a valve body seat 408. Valve body 402 also includes an o-ring groove 410. Valve body 402 has a plurality of discharge ports that extend laterally from passageway 404. Specifically, valve body 402 has discharge ports 412*a-d* (only 412*a-c* being visible) and discharge ports 414*a-d* (only 414*a* and 414*c-d* being visible). Discharge ports 414*a-d* have a flow area that is less restrictive than the flow area of discharge ports 412*a-d* which enables the flowrate and pressure drop of treatment fluid through check valve assembly 400 to be adjustable as discussed below.

Check valve assembly 400 includes a valve cap 416 that is slidably received about a cylindrical section 418 of valve body 402. Valve cap 416 has an opening 420 and a valve cap seat 422. In the illustrated embodiment, valve cap 416 has four discharge ports 424*a-d* (only 124*a-c* being visible). This design enables selective alignment of discharge ports 424 with either discharge ports 412 or discharge ports 414. When discharge ports 424 are aligned with discharge ports 412, flow through discharge ports 414 is prevented. Likewise, when discharge ports 424 are aligned with discharge ports 414, flow through discharge ports 412 is prevented. In this manner, selective positioning of valve cap 416 on valve body 402 determines whether discharge ports 412 or discharge ports 414 are available for flow which in turn determines the resistance to flow encounter by the treatment fluid traveling through check valve assembly 400.

A piston 426 is disposed within passageway 404. Piston 426 has an upper sealing surface 428 and a lower sealing surface 430. A spring 432 is disposed within passageway 404 between piston 426 and valve cap 416. Spring 432 biases piston 426 downwardly or toward the closed position of check valve assembly 400. A filter member 434 is integral with valve body 402 forming part of inlet 406. Filter member 434 has a plurality of openings 436 therethrough.

The operation of check valve assembly 400 will now be described. As illustrated, discharge ports 424 have been aligned with discharge ports 412 such that check valve assembly 400 is in its more restrictive configuration. Prior to the stimulation operation, as best seen in FIG. 6A, lower sealing surface 430 of piston 426 is engaged with valve body seat 408. In this configuration, spring 432 biases piston 426 downwardly and any pressure from the wellbore communicates through opening 420 of valve cap 416, which also biases piston 426 downwardly. The seal created between piston 426 and valve body 402 prevents fluid communication between inlet 406 and discharge ports 412, 414.

Once the stimulation operation commences, piston 426 is lifted off valve body seat 408 when the pressure inside of the injection assembly reached a predetermined level sufficient to overcome the spring force and any opposing wellbore pressure. Once piston 426 is lifted off valve body seat 408, the internal pressure of the injection assembly is now applied to a larger area on piston 426 which means the pressure to maintain check valve assembly 400 in the open position is less than the pressure required to open check valve assembly 400. As best seen in FIG. 6B, piston 426 travels upwardly in passageway 404 until upper sealing surface 428 engages with valve cap seat 422 forming a seal therewith. In this configuration, the treatment fluid enters check valve assembly 400 at inlet 406 passing through filter 434 and exits check valve assembly 400 through discharge ports 412 of valve body 402 and discharge ports 424 of valve cap 416.

When the stimulation operation is complete, the internal pressure within the injection assembly is reduced until it is no longer sufficient to overcome the spring force and any opposing wellbore pressure. Lower sealing surface 430 of piston 426 then reengages with valve body seat 408, as best seen in FIG. 6A. In this configuration, production fluids are disallowed from entering the completion string through check valve assembly 400.

Referring now to FIGS. 7A-7C, therein is depicted a check valve assembly for well stimulation operations according to an embodiment of the present invention that is generally designated 500. Check valve assembly 500 includes a valve body 502 having an axially extending passageway 504 that has an inlet 506 and a valve body seat 508. Valve body 502 also includes an o-ring groove 510. Valve body 502 has a plurality of discharge ports that extend laterally from passageway 504. Specifically, valve body 502 has discharge ports 512*a-d* (only 512*a-c* being visible) and discharge ports 514*a-d* (only 514*a* and 514*c-d* being visible). Discharge ports 514*a-d* have a flow area that is less restrictive than the flow area of discharge ports 512*a-d* which enables the flowrate and pressure drop of treatment fluid through check valve assembly 500 to be adjustable as discussed below.

Check valve assembly 500 includes a valve cap 516 that is slidably received about a square prism section 518 of valve body 502. Valve cap 516 has an opening 520 and a valve cap seat 522. In addition, valve cap 516 includes a pair of oppositely disposed rails 516*a*, 516*b* that cooperate with square prism section 518 of valve body 502 to enable and disable discharge ports 512, 514. Specifically, when rails 516*a*, 516*b* are aligned with sides 518*a*, 518*b* of square prism section 518, discharge ports 514 are available but discharge ports 512 are blocked. Alternatively, when rails 516*a*, 516*b* are aligned with sides 518*c*, 518*d* of square prism section 518, discharge ports 512 are available but discharge ports 514 are blocked. In this manner, selective positioning of valve cap 516 on valve body 502 determines whether discharge ports 512 or discharge ports 514 are available for flow which in turn determines the resistance to flow encounter by the treatment fluid traveling through check valve assembly 500.

A piston 526 is disposed within passageway 504. Piston 526 has an upper sealing surface 528 and a lower sealing surface 530. A spring 532 is disposed within passageway 504 between piston 526 and valve cap 516. Spring 532 biases piston 526 downwardly or toward the closed position of check valve assembly 500. A filter member 534 is integral with valve body 502 forming part of inlet 506. Filter member 534 has a plurality of openings 536 therethrough.

The operation of check valve assembly 500 will now be described. As illustrated, rails 516a, 516b are aligned with sides 518c, 518d of square prism section 518 such that check valve assembly 500 is in its more restrictive configuration. Prior to the stimulation operation, as best seen in FIG. 7A, lower sealing surface 530 of piston 526 is engaged with valve body seat 508. In this configuration, spring 532 biases piston 526 downwardly and any pressure from the wellbore communicates through opening 520 of valve cap 516, which also biases piston 526 downwardly. The seal created between piston 526 and valve body 502 prevents fluid communication between inlet 506 and discharge ports 512, 514.

Once the stimulation operation commences, piston 526 is lifted off valve body seat 508 when the pressure inside of the injection assembly reached a predetermined level sufficient to overcome the spring force and any opposing wellbore pressure. Once piston 526 is lifted off valve body seat 508, the internal pressure of the injection assembly is now applied to a larger area on piston 526 which means the pressure to maintain check valve assembly 500 in the open position is less than the pressure required to open check valve assembly 500. As best seen in FIG. 7B, piston 526 travels upwardly in passageway 504 until upper sealing surface 528 engages with valve cap seat 522 forming a seal therewith. In this configuration, the treatment fluid enters check valve assembly 500 at inlet 506 passing through filter 534 and exits check valve assembly 500 through discharge ports 512 of valve body 502.

When the stimulation operation is complete, the internal pressure within the injection assembly is reduced until it is no longer sufficient to overcome the spring force and any opposing wellbore pressure. Lower sealing surface 530 of piston 526 then reengages with valve body seat 508, as best seen in FIG. 7A. In this configuration, production fluids are disallowed from entering the completion string through check valve assembly 500.

Referring now to FIGS. 8A-8C, therein is depicted a check valve assembly for well stimulation operations according to an embodiment of the present invention that is generally designated 600. Check valve assembly 600 includes a valve body 602 having an axially extending passageway 604 that has an inlet 606 and a valve body seat 608. Valve body 602 also includes an o-ring groove 610. Valve body 602 has a plurality of discharge ports 612a-d that extend laterally from passageway 604. (only 612a-c being visible).

Check valve assembly 600 includes a valve cap 616 that is slidably received about a cylindrical section 618 of valve body 602. Valve cap 616 has an opening 620 and a valve cap seat 622. A piston 626 is disposed within passageway 604. Piston 626 has an upper sealing surface 628 and a lower sealing surface 630. A spring 632 is disposed within passageway 604 between piston 626 and valve cap 616. Spring 632 biases piston 626 downwardly or toward the closed position of check valve assembly 600.

The operation of check valve assembly 600 will now be described. Prior to the stimulation operation, as best seen in FIG. 8A, lower sealing surface 630 of piston 626 is engaged with valve body seat 608. In this configuration, spring 632 biases piston 626 downwardly and any pressure from the wellbore communicates through opening 620 of valve cap 616, which also biases piston 626 downwardly. The seal created between piston 626 and valve body 602 prevents fluid communication between inlet 606 and discharge ports 612.

Once the stimulation operation commences, piston 626 is lifted off valve body seat 608 when the pressure inside of the injection assembly reached a predetermined level sufficient to overcome the spring force and any opposing wellbore pressure. Once piston 626 is lifted off valve body seat 608, the internal pressure of the injection assembly is now applied to a larger area on piston 626 which means the pressure to maintain check valve assembly 600 in the open position is less than the pressure required to open check valve assembly 600. As best seen in FIG. 8B, piston 626 travels upwardly in passageway 604 until upper sealing surface 628 engages with valve cap seat 622 forming a seal therewith. In this configuration, the treatment fluid enters check valve assembly 600 at inlet 606 and exits check valve assembly 600 through discharge ports 612 of valve body 602.

When the stimulation operation is complete, the internal pressure within the injection assembly is reduced until it is no longer sufficient to overcome the spring force and any opposing wellbore pressure. Lower sealing surface 630 of piston 626 then reengages with valve body seat 608, as best seen in FIG. 8A. In this configuration, production fluids are disallowed from entering the completion string through check valve assembly 600.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A check valve assembly for well stimulation operations comprising:
   a valve body having an axially extending passageway including an inlet and a valve body seat, the valve body having a first discharge port extending in a first lateral direction from the passageway;
   a valve cap slidably engagable with the valve body, the valve cap having an opening with a valve cap seat and at least one discharge port that is alignable with the first discharge port of the valve body;
   a piston disposed within the passageway, the piston having first and second sealing surfaces and open and closed positions, in the closed position, the first sealing surface engages the valve body seat to prevent fluid communication between the inlet and the first discharge port, in the open position, the second sealing surface engages the valve cap seat allowing fluid communication between the inlet and the first discharge port; and
   a spring disposed within the passageway between the piston and the valve cap, the spring biasing the piston toward the closed position.

2. The check valve assembly as recited in claim 1 wherein the valve body has a cylindrical section and wherein the valve cap slidably engages the cylindrical section of the valve body in the axial direction.

3. The check valve assembly as recited in claim 1 wherein the valve body has a square prism section and wherein the valve cap slidably engages the square prism section of the valve body in a direction orthogonal to the axial direction.

4. The check valve assembly as recited in claim 1 further comprising a filter member positioned within the passageway proximate to the inlet.

5. The check valve assembly as recited in claim 1 further comprising a filter member integral with the valve body.

6. The check valve assembly as recited in claim 1 wherein the valve body has a second discharge port extending in a second lateral direction from the passageway, the second discharge port having a flow area that is less restrictive than a flow area of the first discharge port.

7. The check valve assembly as recited in claim 6 wherein the at least one discharge port of the valve cap is selectively alignable with the first discharge port and the second discharge port such that a pressure drop in fluids traveling through the check valve is adjustable.

8. The check valve assembly as recited in claim 6 wherein the valve body has a pair of oppositely disposed first discharge ports and a pair of oppositely disposed second discharge ports.

9. The check valve assembly as recited in claim 8 wherein the valve cap has at least two discharge ports that are selectively alignable with the pair of first discharge ports and the pair of second discharge ports such that a pressure drop in fluids traveling through the check valve is adjustable.

10. The check valve assembly as recited in claim 6 wherein the valve body has two pair of oppositely disposed first discharge ports and two pair of oppositely disposed second discharge ports.

11. The check valve assembly as recited in claim 10 wherein the valve cap has at least four discharge ports that are selectively alignable with the two pair of first discharge ports and the two pair of second discharge ports such that a pressure drop in fluids traveling through the check valve is adjustable.

12. The check valve assembly as recited in claim 1 wherein the first and second sealing surfaces of the piston are oppositely disposed from one another.

13. A check valve assembly for well stimulation operations comprising:
a valve body having an axially extending passageway including an inlet and a valve body seat, the valve body having a square prism section with a pair of oppositely disposed first sides and a pair of oppositely disposed second sides, the valve body having a first discharge port extending laterally from the passageway to one of the first sides and a second discharge port extending laterally from the passageway to one of the second sides, the second discharge port having a flow area that is less restrictive than a flow area of the first discharge port;
a valve cap having a pair of oppositely disposed rails that are slidably engagable with the square prism section of the valve body, in a first configuration, the rails slide relative to the first sides of the square prism section enabling flow through the second discharge port, in a second configuration, the rails slide relative to the second sides of the square prism section enabling flow through the first discharge port, the valve cap having an opening with a valve cap seat;
a piston disposed within the passageway, the piston having first and second sealing surfaces and open and closed positions, in the closed position, the first sealing surface engages the valve body seat to prevent fluid communication between the inlet and the discharge ports, in the open position, the second sealing surface engages the valve cap seat allowing fluid communication between the inlet and the discharge ports; and
a spring disposed within the passageway between the piston and the valve cap, the spring biasing the piston toward the closed position.

14. The check valve assembly as recited in claim 13 further comprising a filter member integral with the valve body.

15. The check valve assembly as recited in claim 13 wherein the valve body has a pair of oppositely disposed first discharge ports and a pair of oppositely disposed second discharge ports.

16. The check valve assembly as recited in claim 13 wherein the valve body has two pair of oppositely disposed first discharge ports and two pair of oppositely disposed second discharge ports.

17. A check valve assembly for well stimulation operations comprising:
a valve body having an axially extending passageway including an inlet and a valve body seat, the valve body having two pair of oppositely disposed discharge ports extending laterally from the passageway;
a valve cap slidably engagable with the valve body, the valve cap having an opening with a valve cap seat;
a piston disposed within the passageway, the piston having first and second sealing surfaces, in a closed position, the first sealing surface engages the valve body seat to prevent fluid communication between the inlet and the at least one discharge port, in an open position, the second sealing surface engages the valve cap seat allowing fluid communication between the inlet and the at least one discharge port; and
a spring disposed within the passageway between the piston and the valve cap, the spring biasing the piston toward the closed position.

18. The check valve assembly as recited in claim 17 wherein the valve body has a cylindrical section and wherein the valve cap slidably engages the cylindrical section of the valve body in the axial direction.

19. A check valve assembly for well stimulation operations comprising:
a valve body having an axially extending passageway including an inlet and a valve body seat, the valve body having a first discharge port extending in a first lateral direction from the passageway, the valve body having a square prism section;
a valve cap slidably engagable with the square prism section of the valve body in a direction orthogonal to the axial direction, the valve cap having an opening with a valve cap seat;
a piston disposed within the passageway, the piston having first and second sealing surfaces and open and closed positions, in the closed position, the first sealing surface engages the valve body seat to prevent fluid communication between the inlet and the first discharge port, in the open position, the second sealing surface engages the valve cap seat allowing fluid communication between the inlet and the first discharge port; and
a spring disposed within the passageway between the piston and the valve cap, the spring biasing the piston toward the closed position.

20. The check valve assembly as recited in claim 19 wherein the valve cap has at least one discharge port that is alignable with the first discharge port of the valve body.

21. The check valve assembly as recited in claim 19 wherein the valve body has a second discharge port extending in a second lateral direction from the passageway, the second discharge port having a flow area that is less restrictive than a flow area of the first discharge port.

22. The check valve assembly as recited in claim 19 wherein the valve cap has at least one discharge port that is selectively alignable with the first discharge port and the second discharge port such that a pressure drop in fluids traveling through the check valve is adjustable.

23. A check valve assembly for well stimulation operations comprising:
a valve body having an axially extending passageway including an inlet and a valve body seat, the valve body having a first discharge port extending in a first lateral direction from the passageway and a second discharge port extending in a second lateral direction from the passageway, the second discharge port having a flow area that is less restrictive than a flow area of the first discharge port;

a valve cap slidably engagable with the valve body, the valve cap having an opening with a valve cap seat;

a piston disposed within the passageway, the piston having first and second sealing surfaces and open and closed positions, in the closed position, the first sealing surface engages the valve body seat to prevent fluid communication between the inlet and the first discharge port, in the open position, the second sealing surface engages the valve cap seat allowing fluid communication between the inlet and the first discharge port; and a spring disposed within the passageway between the piston and the valve cap, the spring biasing the piston toward the closed position.

24. The check valve assembly as recited in claim 23 wherein the valve body has a cylindrical section and wherein the valve cap slidably engages the cylindrical section of the valve body in the axial direction.

25. The check valve assembly as recited in claim 23 wherein the valve body has a square prism section and wherein the valve cap slidably engages the square prism section of the valve body in a direction orthogonal to the axial direction.

26. The check valve assembly as recited in claim 23 wherein the valve cap has at least one discharge port that is selectively alignable with the first discharge port and the second discharge port such that a pressure drop in fluids traveling through the check valve is adjustable.

* * * * *